(12) United States Patent
Duscha (10) Patent No.: US 11,459,961 B2
(45) Date of Patent: Oct. 4, 2022

(54) METHOD FOR OPERATING A POWER PLANT, AND POWER PLANT

(71) Applicant: General Electric Company, Schenectady, NY (US)

(72) Inventor: Andreas Duscha, Baden (CH)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/160,867

(22) Filed: Jan. 28, 2021

(65) Prior Publication Data
US 2021/0396185 A1 Dec. 23, 2021

(30) Foreign Application Priority Data

Feb. 5, 2020 (EP) ..................................... 20155657

(51) Int. Cl.
*F02C 9/46* (2006.01)
*F02C 7/232* (2006.01)
(Continued)

(52) U.S. Cl.
CPC .................. *F02C 9/46* (2013.01); *F02C 3/22* (2013.01); *F02C 6/18* (2013.01); *F02C 7/232* (2013.01); *F05D 2220/72* (2013.01); *F05D 2260/80* (2013.01); *F05D 2260/84* (2013.01); *F05D 2270/053* (2013.01); *F05D 2270/09* (2013.01); *F05D 2270/3013* (2013.01)

(58) Field of Classification Search
CPC ............. F05D 2260/80; F05D 2260/84; F05D 2270/053; F05D 2270/09; F05D 2270/3013
See application file for complete search history.

(56) References Cited

U.S. PATENT DOCUMENTS 6,176,074 B1 * 1/2001 Thompson ................ F02C 9/46
60/773
6,907,722 B2 * 6/2005 Tanaka ...................... F02C 9/20
60/39.465
(Continued)

FOREIGN PATENT DOCUMENTS

EP 3078837 A1 10/2016
EP 3081785 A1 10/2016

OTHER PUBLICATIONS

European Search Report Corresponding to EP20155657 dated Sep. 1, 2020.

*Primary Examiner* — Alain Chau
(74) *Attorney, Agent, or Firm* — Dority & Manning, P.A.

(57) ABSTRACT

A method for operating a power plant, having at least one gas turbine engine and at least one fuel gas compressor, includes supplying fuel gas through a utility supply line, compressing the fuel gas to a plant supply pressure in the operating fuel gas compressor, and supplying the compressed fuel gas to a plant supply line. The gas turbine engine is operated at a set power output according to a power demand signal. If a failure of an operating fuel gas compressor is detected, the power output of the gas turbine engine is reduced to an emergency power output (which is lower than the set power output), and the power output of the gas turbine engine is restricted to the emergency power output. The reduction of the power output is performed in one single step and is controlled by at least one feedforward control signal.

19 Claims, 2 Drawing Sheets

(51) Int. Cl.
*F02C 3/22* (2006.01)
*F02C 6/18* (2006.01)

(56) References Cited

U.S. PATENT DOCUMENTS

| | | | | |
|---|---|---|---|---|
| 7,430,868 | B2* | 10/2008 | Socher | F02C 9/46 60/776 |
| 8,776,528 | B2* | 7/2014 | Liedtke | F02C 7/22 431/38 |
| 9,097,188 | B2* | 8/2015 | Tanabe | F02C 9/40 |
| 9,650,909 | B2* | 5/2017 | Smith | F04D 17/12 |
| 9,822,703 | B2* | 11/2017 | Yu | F02C 9/26 |
| 10,480,422 | B2* | 11/2019 | Nakagawa | F04D 27/0246 |
| 10,584,645 | B2* | 3/2020 | Nakagawa | F02C 9/50 |
| 2004/0045275 | A1* | 3/2004 | Tanaka | F02C 9/20 60/39.281 |
| 2007/0068168 | A1* | 3/2007 | Socher | F02C 9/46 60/773 |
| 2008/0128029 | A1* | 6/2008 | Gorman | F02C 9/46 700/275 |
| 2010/0281843 | A1* | 11/2010 | Smith | F01D 17/08 415/17 |
| 2010/0287945 | A1* | 11/2010 | Liedtke | F02C 3/22 60/773 |
| 2011/0167783 | A1* | 7/2011 | Tanabe | F02C 7/236 60/737 |
| 2012/0161965 | A1* | 6/2012 | Babu | F04B 51/00 340/540 |
| 2013/0255271 | A1* | 10/2013 | Yu | F02C 3/22 60/776 |
| 2015/0184594 | A1* | 7/2015 | Stammen | F02C 7/22 60/734 |
| 2016/0341131 | A1 | 11/2016 | Nakagawa et al. | |
| 2017/0009664 | A1 | 1/2017 | Nakagawa et al. | |
| 2017/0044997 | A1 | 2/2017 | Nakagawa et al. | |
| 2017/0082033 | A1* | 3/2017 | Wu | F04D 29/542 |
| 2017/0284386 | A1* | 10/2017 | Nakaniwa | G05B 23/0243 |

* cited by examiner

METHOD FOR OPERATING A POWER PLANT, AND POWER PLANT

CROSS-REFERENCE TO RELATED APPLICATIONS

This application claims priority pursuant to 35 U.S.C. 119(a) of European Application No. 20155657.8, filed Feb. 5, 2020, which application is incorporated herein by reference in its entirety.

TECHNICAL FIELD

The present disclosure relates to a method for operating a power plant and a power plant configured to be operated according to the method, as set forth in the claims.

BACKGROUND OF THE DISCLOSURE

A gas turbine or combined cycle power plant comprises one or more gas turbine engines and, if the gas turbine engines are intended to be operated on fuel gas, a fuel gas supply system. The fuel gas supply system typically includes either at least one fuel gas compressor or reducing equipment, or a combination of both. A fuel gas compressor may be dedicated to one single gas turbine engine or may be configured to operate on a common header which is connected to a plurality of gas turbine engines.

In order to provide stable gas supply pressure during gas turbine steady state operation, the fuel gas supply system comprises pressure controllers, which typically work slowly to avoid steep pressure gradients and significant oscillations of the supply pressure of the fuel gas supplied to the gas turbine engines. The load control of the power plant also works comparatively slowly to account for the delay times of feedback signals inherent to the power plant.

While these systems yield stable operation of the gas turbine engines and other rotating equipment of the power plant, these control mechanisms may be too slow if unexpected transients occur.

For the sake of plant economics, which includes economizing self-consumption by the plant and auxiliaries, as well as the investment cost, the fuel gas compressors are generally designed and operated so as to run close to full load at a fuel mass flow and pressure just sufficient to operate the one or more gas turbine engines in steady state at rated load. Hence, failure of a fuel gas compressor may, with the one or more gas turbine engines running at a set power output, result in a fast drop of the plant fuel gas supply pressure on which the control systems may not be able to react. The gas turbine engines may thus experience a sudden shutdown either due to a lack of capability of the control systems to adjust fuel control valve, or the simple lack of a sufficient mass flow of fuel gas at a minimum required plant fuel gas supply pressure.

In a combined cycle power plant, the shutdown of the gas turbine engine or the gas turbine engines also results in a fast steam turbine shutdown. A sudden shutdown, also referred to as a "trip", of major rotating equipment results in heavy stresses in the thermally loaded parts of gas and steam turbines, and accordingly high lifetime consumption, and the potential need for delays until the power plant again supplies power to the grid.

SUMMARY

It is an object of the presently disclosed subject matter to provide a method for operating a power plant of the type initially mentioned and a power plant suitable for being operated according to said method. In a more specific aspect, a method shall be provided which prevents the sudden shutdown of major rotating equipment of a power plant upon failure of a fuel gas compressor. In more specific aspects, it may be found desirable to be able to return to a normal, e.g. unrestricted load-controlled operation mode, so as to provide a scheduled or demanded power output to the grid.

This is achieved by the subject matter described in the independent claims. Specifically, according to one aspect, a power plant includes at least one gas turbine engine, a gas turbine engine control system, at least one fuel gas compressor, a fuel gas pressure control system, and a plant supply line connecting a downstream end of the at least one fuel gas compressor and the at least one gas turbine engine. An upstream end of the at least one fuel gas compressor is connected to a utility supply line. A control line is provided from the fuel gas pressure control system to the gas turbine engine control system and is adapted and configured to forward a fuel gas compressor failure signal from the fuel gas pressure control system to the gas turbine engine control system. In response to a fuel gas compressor failure signal, the gas turbine engine control system is adapted and configured to forward a preset feedforward emergency control signal to at least one fuel flow control valve of the at least one gas turbine engine.

According to another aspect, the present disclosure provides a method for operating a power plant comprising at least one gas turbine engine and at least one fuel gas compressor. The method includes supplying fuel gas through a utility supply line, wherein the fuel gas in the utility supply line is at a line supply pressure; compressing the fuel gas to a plant supply pressure in at least one operating fuel gas compressor; and supplying the compressed fuel gas to a plant supply line. The method further includes operating at the at least one gas turbine engine at a set power output according to a power demand signal; and detecting whether the at least one operating fuel gas compressor has a failure. If a failure of the at least one operating fuel gas compressor is detected, the method includes reducing the power output of the at least one gas turbine engine to an emergency power output, which is lower than the set power output, and restricting the power output of the at least one gas turbine engine to the emergency power output. The reduction of the power output is performed in one single step and controlled by at least one feedforward control signal.

Further effects and advantages of the disclosed subject matter, whether explicitly mentioned or not, will become apparent in view of the disclosure provided below.

It is noted that within the framework of the present disclosure the use of the indefinite article "a" or "an" in no way stipulates a singularity nor does it exclude the presence of a multitude of the named member or feature. It is thus to be read in the sense of "at least one" or "one or a multitude of."

Specifically, the present disclosure is directed to a method for operating a power plant, wherein the power plant comprises at least one gas turbine engine and at least one fuel gas compressor. The method comprises supplying fuel gas through a utility supply line, wherein the fuel gas in the utility supply line is at a line supply pressure. The fuel gas supplied through the utility supply line and at the line supply pressure is subsequently compressed to a plant supply pressure in at least one operating fuel gas compressor and the compressed fuel gas at the plant supply pressure is supplied to a plant supply line.

The skilled person will readily understand that from the plant supply line the compressed fuel gas is supplied to the at least one gas turbine engine through at least one fuel gas control valve of each gas turbine engine. The skilled person will further appreciate, that the at least one fuel control valve may comprise a control valve for controlling the total fuel gas mass flow to a respective gas turbine engine, but may also, in addition or alternatively, comprise control or stop valves for distributing the fuel gas mass flow to, for instance, while not being limited to, different fuel lances, burners, fuel discharge openings of a burner, or combustion zones within a gas turbine engine.

The method comprises, initially, operating the gas turbine engine at a set power output according to a power demand signal. That is, the operation of the gas turbine engine is controlled by a load controller and at a power output matching a control input according to an externally scheduled demand signal. The method further comprises detecting whether the at least one operating fuel gas compressor experiences a failure. This functionality can, for example, while not being limited to, be included into a fuel gas pressure controller. According to the herein disclosed method, if a failure of an operating fuel gas compressor is detected, which means that this fuel gas compressor may no longer be operating, the power output of the at least one gas turbine engine is reduced to an emergency power output which is lower than the set power output.

The term "emergency power output" is, in this respect, to be interpreted broadly, and the method may, in embodiments, comprise step-downloading the at least one gas turbine engine to "full speed—no load." That is, the power output to the grid from the at least one gas turbine engine is zero, but the at least one gas turbine engine is maintained running at at least essentially a speed which is synchronous with the grid frequency. However, as outlined in more detail below, if the flue gas from the at least one gas turbine engine is used to generate steam in a combined cycle power plant, this may likely require a shut-down of the steam turbine, as the mass flow and temperature of the flue gas at "full speed—no load" may be insufficient to maintain a minimum required live steam temperature and/or mass flow.

The power output of the at least one gas turbine engine is subsequently restricted to the emergency power output. The reduction of the power output is performed in one single step and, in particular, may be a sudden deloading, in an essentially discontinuous, step-like manner, and is controlled by at least one feedforward signal. That is, the control signal or control signals are directly sent by a control system and fed to certain hardware control members without involving a closed loop controller. The at least one feedforward control signal is not dependent on a control loop and hence provides significantly faster dynamics than a closed loop control signal.

In embodiments, the method comprises providing a feedforward control signal to at least one fuel flow control valve of the at least one gas turbine engine, changing the valve position to a predefined emergency position, and subsequently operating the at least one gas turbine engine in a load control mode at the emergency power output. The skilled person will readily appreciate that feedforward signals may also be sent to other hardware components of the at least one gas turbine engine, like, for instance, rows of variable inlet guide vanes, and feedforward signals may be used to adjust further operating parameters to the emergency power output.

In particular embodiments, the predefined emergency position of the at least one fuel flow control valve may be determined, for instance during test runs, as a valve position that is suitable to safely operate the at least one gas turbine engine at approximately the emergency power output. In other words, the predetermined emergency valve position is a valve position corresponding to the position of the at least one fuel flow control valve expected at the emergency power output if it were operated in closed loop control.

In providing the feedforward control signal, the gas turbine engine is very quickly deloaded to approximately the emergency power output, wherein a fine adjustment of the actual power output to the emergency power output may then be achieved by a closed loop load control. The fuel gas consumption of the at least one gas turbine engine is accordingly reduced very quickly, such that the fuel gas buffered in a buffering volume provided by the plant supply line and/or in communication with the plant supply line can longer sustain the supply of fuel gas to the at least one gas turbine engine at a sufficiently high plant supply pressure. As mentioned above, the at least one fuel control valve may comprise a control valve for controlling the fuel gas mass flow the respective gas turbine engine, but may also, in addition or alternatively, comprise control or stop valves for distributing the fuel gas mass flow to, for instance, while not being limited to, different fuel lances, burners, fuel discharge openings of a burner, or combustion zones within a gas turbine engine.

It is generally understood that the fuel gas compressors operate according to a characteristic map of pressure ratio vs. inlet mass flow, or, provided a constant pressure in the utility supply line, plant supply pressure vs. mass flow. Moreover, the at least one gas turbine engine, at each power output, has a characteristic pair of fuel mass flow and required minimum fuel gas pressure. Steady state operation is attainable if the mass flow required by the at least one gas turbine engine at a specific power output is lower than the mass flow the at least one fuel gas compressor can convey at the required minimum fuel gas pressure at said specific power output. Hence, if upon failure of a fuel gas compressor, the power output of the at least one gas turbine engine is reduced to an emergency power output at which the consumed fuel mass flow is lower than the mass flow at least one fuel gas compressor remaining in operation can convey at the required minimum fuel gas pressure at said power output, operation of the at least one gas turbine engine at the emergency power output can be sustained for an essentially unlimited time.

In other instances, as outlined below, it might be the case that the line supply pressure is sufficient to sustain operation of the at least one gas turbine engine at an emergency power output. However, if no fuel gas compressor remains in operation that can supply the required fuel mass flow at the required fuel gas pressure, it may be considered that at least the plant supply line provides a buffering volume, which is initially, upon failure of a fuel gas compressor, charged with buffered fuel gas at an initial pressure. This buffered fuel gas may be used to make up for a difference between the fuel mass flow requirement of the at least one gas turbine engine and the supply capacity, if any, of the fuel gas compressor or the fuel gas compressors remaining in operation.

In such a case, the plant supply pressure in the plant supply line steadily drops as a net extraction of fuel gas takes place. Thus, operation of the at least one gas turbine engine may be sustained for a limited time. Said time, ideally, is sufficient to restore full fuel gas supply capability or at least for a normal shutdown of the at least one gas turbine engine with a significantly lower lifetime consumption than a sudden unscheduled flame-off. Hence, reducing the power output of the at least one gas turbine engine to an emergency power output serves at least one of the following purposes: (a) reduces the fuel mass flow consumed by the at least one gas turbine engine and the required minimum fuel pressure to values that may be sustained by the fuel gas supply system with reduced capacity or without additional fuel gas compression, and/or (b) reduces the fuel mass flow consumed by the at least one gas turbine engine and the required minimum fuel pressure to extend the time until the pressure in the plant supply line has dropped below the required minimum fuel pressure at the emergency power output.

It is understood that, preferably, the emergency power output is sufficiently high so as to maintain the generators of the gas turbine engines connected to the grid.

In further non-nonlimiting embodiments, the method comprises determining a critical gas turbine engine power output, which is sustainable based upon the fuel gas mass flow/output pressure characteristics of one or more fuel gas compressors remaining in operation; and determining the emergency power output to be lower or at most equal to the critical power output. A shutdown of the at least one gas turbine engine can thus be avoided.

In further non-limiting embodiments, the method comprises guiding the exhaust gas mass flow of the at least one gas turbine engine through at least one heat recovery steam generator, generating steam, and supplying the generated steam to a steam turbine to drive the steam turbine, wherein the emergency power output is higher than or at least equal to a minimum gas turbine engine power output required to generate steam of a minimum mass flow, pressure and temperature to drive the steam turbine. A shutdown of the steam turbine engine can thus be avoided.

Since the major rotating equipment (that is, the gas turbine engines and, optionally, steam turbine engines) remain in operation and standstill is avoided, the lifetime consumption is largely reduced, and delay times for a complete start up from standstill are avoided. Both measures yield significant economic and technical advantages.

In frequently applied embodiments, the power plant comprises redundant fuel gas compressing capacities. For instance, out of three fuel gas compressors, only two are required to operate the power plant at a rated power output. In this respect, at the time of the failure of a single fuel gas compressor, one fuel gas compressor is non-operative. The herein disclosed method, in these cases, may comprise starting and putting into operation a previously non-operative fuel gas compressor.

The method may then further comprise determining a minimum required plant supply pressure for operation of the at least one gas turbine engine at the emergency power output, determining a start-up time of the previously non-operative fuel gas compressor, and providing a buffering volume suitable for buffering fuel gas. The buffering volume is fluidly arranged between the at least one fuel gas compressor and the at least one gas turbine engine, wherein said buffering volume is sufficiently large to supply fuel gas to the at least one gas turbine engine running at the emergency power output after fuel gas compressor failure and before the previously non-operative fuel gas compressor is in full operation without the pressure in the buffering volume dropping below the minimum required plant supply pressure. In embodiments, the buffering volume is provided in and by the plant supply line, i.e., the fuel supply line extending from downstream of the at least one fuel gas compressor to the at least one gas turbine engine. In particular non-limiting embodiments, the method may comprise providing the fuel supply lines with a sufficiently large cross section or, more specifically, a sufficiently large diameter so as to provide a sufficient buffering volume.

Once the previously non-operative fuel gas compressor is in full operation, the restriction of the power output to the emergency power output may be terminated, and the power output of the at least one gas turbine engine may be controlled by the power demand signal to return to a normal operation of the power plant.

In certain power plants, a bypass line is installed, which connects the utility supply line and the plant supply line and which bypasses the at least one fuel gas compressor, and a check valve is installed in said bypass line to avoid backflow of fuel gas from the plant supply line into the utility supply line while enabling flow of fuel gas from the utility supply line to the plant supply line. In particular, it may be the case that the line supply pressure provided by the utility company in the utility supply line is sufficiently high so that the at least one gas turbine engine can be operated with the line supply pressure from the utility supply line. In this case, the method may comprise determining a critical gas turbine power output, which is sustainable with the line supply pressure; and determining the emergency power output to be lower or at most equal to said critical power output.

If at least one fuel gas compressor remains in operation after failure of a fuel gas compressor, the method may then further comprise: determining a power output of the at least one gas turbine engine sustainable with the supply line pressure, determining a power output of the at least one gas turbine engine sustainable with the at least one fuel gas compressor remaining in operation, and, if the power output of the at least one gas turbine engine sustainable with the supply line pressure is larger than the power output of the at least one gas turbine engine sustainable with the at least one fuel gas compressor remaining in operation, fluidly isolating the at least one fuel gas compressor remaining in operation from the plant supply line.

In a further aspect in some embodiments, when at least one fuel gas compressor remains in operation after failure of a fuel gas compressor, the method may comprise: determining a critical gas turbine power output which is sustainable with a maximum pressure of the plant supply pressure sustainable by the at least one fuel gas compressor remaining in operation and the line supply pressure; and determining the emergency power output to be lower or at most equal to said critical power output.

In further aspects, disclosed is a power plant comprising at least one gas turbine engine, at least one fuel gas compressor, and a plant supply line connecting a downstream end of the at least one fuel gas compressor and the at least one gas turbine engine, wherein an upstream end of the at least one fuel gas compressor is connected to a utility supply line. The power plant further comprises a fuel gas pressure control system and a gas turbine engine control system. A control line is provided from the fuel gas pressure control system to the gas turbine control system and is adapted and configured to forward a fuel gas compressor failure signal from the fuel gas pressure control system to the gas turbine engine control system. In response to a fuel gas compressor failure signal, the gas turbine engine control system is adapted and configured to forward a preset feedforward emergency control signal at least to at least one fuel flow control valve of the at least one gas turbine engine.

The power plant may, in non-limiting more specific embodiments, further comprise a buffering volume suitable for buffering fuel gas and fluidly arranged between the at least one fuel gas compressor and the at least one gas turbine engine. The buffering volume is sufficiently large to supply fuel gas to the at least one gas turbine engine running at an emergency power output during the time required to start a fuel gas compressor from standstill without the pressure in the buffering volume dropping below a minimum plant supply pressure required to operate the at least one gas turbine engine at the emergency power output.

It is understood that the features and embodiments disclosed above may be combined with each other. It will further be appreciated that further embodiments are conceivable within the scope of the present disclosure and the claimed subject matter, which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

DETAILED DESCRIPTION

Figure 1:
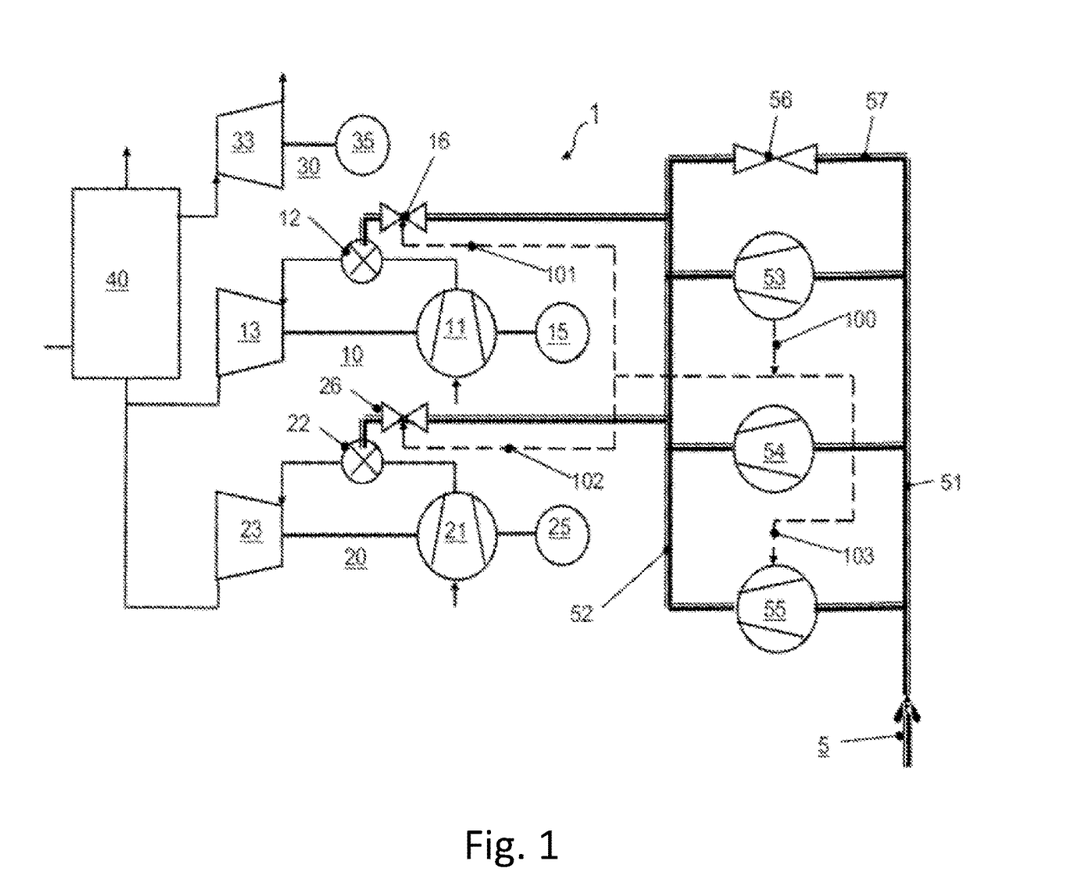
FIG. 1 is an exemplary schematic diagram of an embodiment of a power plant.

FIG. 1 depicts an exemplary combined cycle power plant 1. Combined cycle power plant 1 comprises two gas turbine engines 10 and 20. In a manner familiar to a skilled person, each gas turbine engine 10 and 20 comprises a respective compressor 11 and 21, a respective combustion chamber 12 and 22, a respective expansion turbine 13 and 23 and a respective generator 15 and 25. The respective expansion turbine, compressor, and generator of each gas turbine engine are mechanically coupled by a shaft, such that mechanical power from the expansion turbine drives the compressor and the generator. During operation, compressors 11 and 21 compress ambient air. The compressed ambient air flows to the respective combustion chamber 12, 22, where it is admixed with fuel. The fuel is combusted in the compressed air inside the combustion chamber, and the resultant high-pressure flue gas is guided to the respective expansion turbine 13, 23, where it is expanded and whereby the turbines 13, 23 generate useful shaft power and drive the compressors 11, 21 and generators 15, 25, thereby generating an electric power output of the respective gas turbine engine.

In a manner well-known to the person having skill in the art, the gas turbine engines 10, 20 further comprise a control system which, inter alia, controls the electric power output. The control system is not shown in the current depiction; however, the skilled person is perfectly familiar with a control system in a gas turbine engine and in a power plant, respectively. The control system of each gas turbine engine 10, 20 receives a power demand signal, compares it to an actual electric power output from the respective generator 15, 25, and sends an actuation signal to a respective fuel control valve 16 and 26, thus controlling the mass flow of fuel provided to the combustion chambers 12, 22 such that the actual electric power output matches a set power output corresponding to the power demand signal. As will be readily appreciated, the fuel control valve 16, 26 of each gas turbine engine 10, 20 is thus operated in closed loop control. The skilled person will moreover appreciate that the control parameters are set such that the control loop works relatively slowly, so as to avoid instabilities and oscillations of the control signal.

It is further known to a skilled person that state-of-the-art gas turbine engines are commonly provided with a multitude of fuel control valves so as to, on the one hand, control the total fuel mass flow and, on the other hand, distribute the total fuel mass flow to different burners, combustion zones, fuel discharge orifices, combustors, and so forth. The skilled person is further familiar with the fact that the gas turbine engines (e.g., 10, 20) may comprise multiple combustors, turbines, and compressors. This, however, is not relevant to the understanding of the subject matter of the present disclosure, and hence a quite basic, non-limiting example has been chosen to outline the subject matter of the present disclosure, in which the fuel control system of a gas turbine engine is represented by one single fuel gas control valve.

The exemplary power plant 1 further comprises a heat recovery steam generator 40 and a steam turbine engine 30. Expanded exhaust gases from the expansion turbines 13 and 23 of the gas turbine engines 10, 20 are guided through heat recovery steam generator 40, thereby, in a manner known to the skilled person, exchanging heat with feedwater fed to the heat recovery steam generator 40 and generating steam. Said steam is guided to an expansion steam turbine 33, where it is expanded, thereby generating useful shaft power for driving a steam turbine engine generator 35 and producing additional electrical power output.

Fuel gas 5 is provided by a utility to a utility supply line 51 at a line supply pressure. The supply line pressure may not be sufficient to supply the gas turbine engines when operating through all operating states. Fuel gas compressors 53, 54 and 55 are thus provided for compressing the fuel gas from the line supply pressure to a plant supply pressure. The fuel gas at plant supply pressure is fed through plant supply line 52 to combustion chambers 12 and 22, whereby the fuel mass flow is controlled by fuel control valves 16 and 26. The combustion systems of the gas turbine engines 10, 20 comprise nozzles through which the fuel gas is injected into the compressed air inside the combustion chambers 12, 22. Thus, when provided into the combustion chambers 12, 22, the fuel gas must be supplied at a minimum required fuel gas pressure, which, as will be generally appreciated, as a rule of thumb, is the higher the minimum required fuel gas pressure, the higher the fuel mass flow or the power output of the gas turbine engine is. In other words, if the plant supply pressure drops below a certain threshold, this limits the power output that can be generated by the gas turbine engines 10, 20.

Generally, in order to increase plant reliability, the fuel gas compressors ensure redundancy. That is, the cumulative pressure/mass flow capacity of all fuel gas compressors is higher than the demand of the gas turbines 10, 20, when the gas turbine engines 10, 20 are running at rated power output. For instance, in the shown exemplary embodiment, each fuel gas compressor 53, 54, 55 may be able to provide 50%, or, slightly above 50%, of the maximum fuel gas mass flow cumulatively required by the gas turbine engines 10, 20 running at maximum power output and at the related required fuel gas pressure. Hence, in order to avoid excessive plant auxiliary power consumption, only two out of the three fuel gas compressors may be operated. For instance, fuel gas compressors 53 and 54 may be running, while fuel gas compressor 55 is non-operative.

It will be understood, in this respect, that at least one of the lines connecting each fuel gas compressor 53, 54, 55 with the utility supply line 51 and the plant supply line 52, respectively, is furnished with a check or shut-off valve so as to avoid backflow of fuel gas from the plant supply line to the utility supply line through a non-operative compressor. It will further be appreciated that each fuel gas compressor 53, 54, 55 may be equipped with a line and valve system allowing startup of the respective fuel gas compressor, while another one of the fuel gas compressors 53, 54, 55 is running. Said auxiliary systems of the fuel gas compressors, which are not immediately required for the understanding of the herein disclosed subject matter, are omitted from the drawing for the sake of clarity, but are familiar to a person having skill in the art. The fuel gas compressors 53, 54, 55 are controlled by a pressure control system, which is not shown, but which is well-known to a skilled person.

Figure 2:
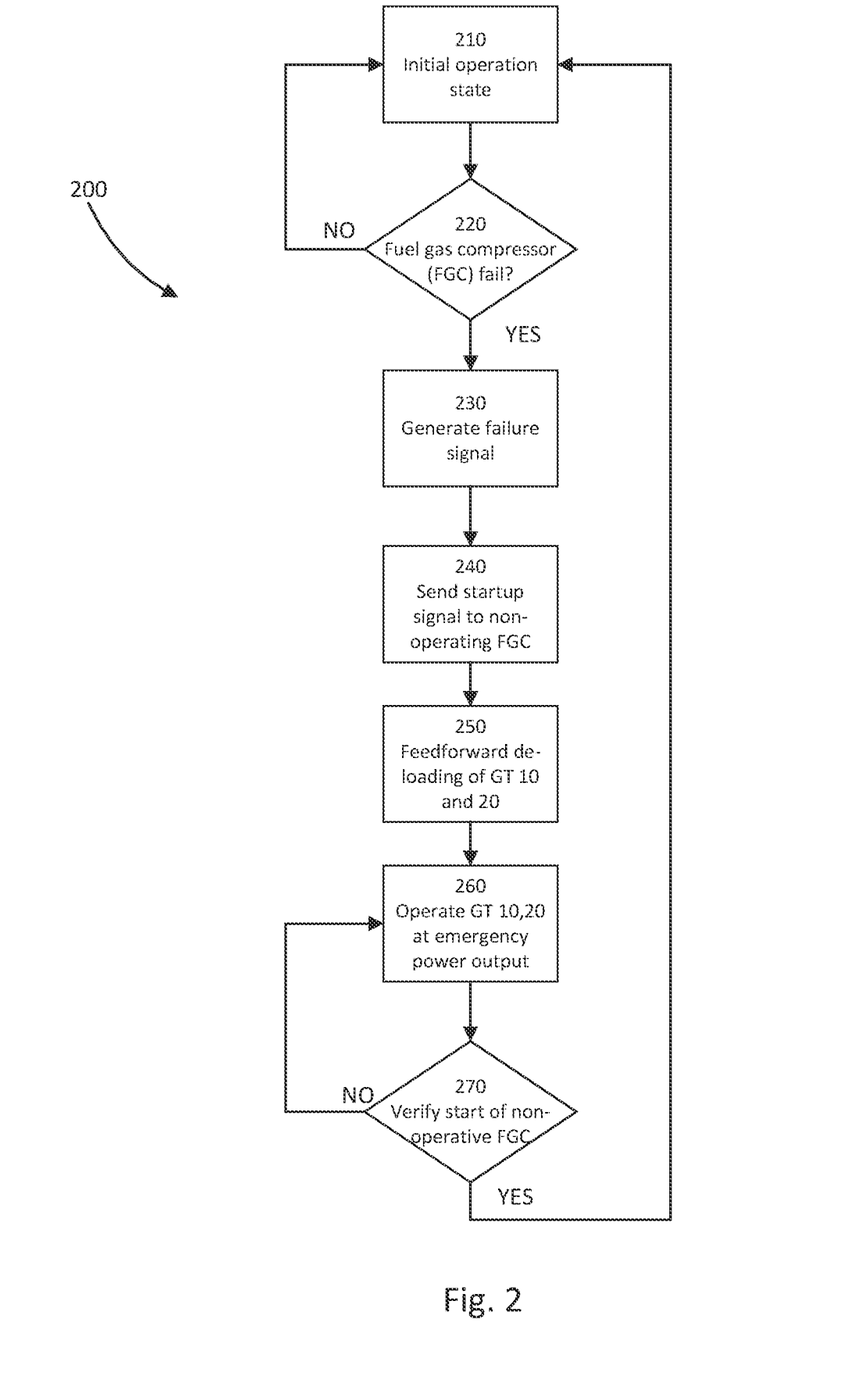
FIG. 2 is a flow diagram of an exemplary embodiment of the present method of operating a power plant.

FIG. 2 outlines an exemplary embodiment of a method 200 as herein described. For outlining the herein disclosed method by virtue of FIG. 1 in connection with FIG. 2, it is now assumed, as indicated above, that, initially, fuel gas compressors 53 and 54 are running, while fuel gas compressor 55 is non-operative. The gas turbine engines 10, 20 are running in closed loop load control mode, as indicated above, wherein the fuel mass flow to the gas turbine engines 10, 20 is controlled by the fuel control valves so as to operate the gas turbine engines 10, 20 at a set power output and according to an externally provided load demand signal. This initial operation state is indicated at 210.

At step 220, it is determined whether an operating fuel gas compressor (e.g., 53, 54) fails. If this is not the case, the gas turbine engines 10, 20 continue to operate in load control mode at the set power output according to a power demand signal at 210. If, however, a failure of an operating fuel gas compressor (for instance, fuel gas compressor 53) is detected, at step 230 a failure signal 100 is generated, and at step 240 a startup signal 103 is sent to non-operating fuel gas compressor 55. However, it requires a certain start up time until previously non-operating fuel gas compressor 55 can fully replace the compression and fuel mass flow capacity previously provided by failed compressor 53. If the gas turbine engines 10, 20 are running at a power output above a certain threshold, remaining fuel gas compressor 54 might not be able to sustain the required fuel mass flow at the required minimum plant supply pressure for operating the gas turbine engines 10, 20 at a power output according to the power demand signal.

If the pressure in the plant supply line 52 drops below a required minimum pressure corresponding to the power output of the gas turbine engines 10, 20, the gas turbine engines 10, 20 will likely be subject to suddenly switching off. That is, the combustion inside the combustion chambers 12, 22 suddenly extinguishes from a high power level, causing high temperature gradients inside the gas turbine engines 10, 20 and, in turn, causing high thermally induced stresses and lifetime consumption. As will be appreciated, shutdown of the gas turbine engines 10, 20 will also cause a shutdown of the steam turbine engine 30.

In addition to the high lifetime consumption of the engines, the power plant completely ceases to produce electric power. Starting the power plant again may require an extended delay time. It may hence be found of paramount interest to avoid the total shutdown of the major rotating equipment, that is, primarily the gas turbine engines 10, 20, but also the steam turbine engine 30. At the time of failure of a fuel gas compressor, plant supply line 52 is filled with fuel gas at the plant supply pressure, and consequently works as a compressed fuel buffering volume. The gas turbine engines 10, 20 may be run on fuel from this buffering volume as long as the pressure in the buffering volume does not drop below a minimum pressure required to operate the gas turbine engines 10, 20 at a specific power output. It is understood that, for a given buffering volume and initial pressure, a certain pressure drop occurs more slowly the less fuel is consumed per time unit, that is, the lower the power output is with which the gas turbine engines 10, 20 are operated.

Moreover, it may generally and reasonably be assumed that, as the critical required minimum plant supply pressure to sustain operation of the gas turbine engines 10, 20 is lower, the power output of the gas turbine engines is lower. Thus, at step 250, a fast, feedforward, de-loading of gas turbine engines 10 and 20 is initiated. To that extent, in the exemplary embodiment herein shown, feedforward control signals 101, 102 are generated in response to the fuel gas compressor failure signal and forwarded to the fuel control systems of the gas turbine engines 10, 20, as simplistically represented by fuel flow control valves 16 and 26. As outlined above, the fuel control systems may be significantly more complex and may comprise a multitude of fuel flow control valves, which control the total fuel mass flow to a gas turbine engine and/or the distribution of fractions of the total fuel mass flow within the combustion system of a gas turbine engine.

The feedforward control signals 101, 102 may also act on the position of one or more rows of variable inlet guide vanes so as to reduce the air mass flow through the gas turbine engines 10, 20. The feedforward control signals 101, 102 are transmitted very quickly and are predetermined fixed signals, which are not subject to closed loop control. Feedforward control signals 101 and 102 are predetermined such that the total fuel mass flow provided to each of the gas turbine engines 10, 20 corresponds to a fuel mass flow required to operate the gas turbine engines 10, 20 approximately at the emergency power output. The fuel flow control valves and other operation parameters are controlled by the feedforward control signals 101, 102 to predetermined values, which ensure a safe operation of the gas turbine engines 10, 20 at the emergency power output. The quantitative values of feedforward control signals 101 and 102 may depend on the actual initial plant supply pressure in plant supply line 52, the type of fuel, and other parameters, like for instance, ambient conditions or power plant operating states, which are familiar to a person having ordinary skill in the art.

It will be readily appreciated that the order of method steps 240 and 250 may be reversed, or they may be performed at least essentially concurrently. The skilled person will appreciate that fuel gas compressor startup signal 103 and feedforward control signals 101, 102 should be generated and provided to the respective components within fractions of seconds. After the power output has been reduced in an essentially discontinuous, step-like manner in reducing the total fuel mass flow, the gas turbine engines 10, 20 may, at step 260, be operated at the emergency power output in a closed loop load control mode.

In step 270, it is verified whether previously non-operative fuel gas compressor 55 has fully started up. As long as this is not the case, the gas turbine engines 10, 20 are continued to be operated at emergency power output in step 260. If, however, fuel gas compressor 55 is fully operative and is capable of fully replacing failed fuel gas compressor 53, the limitation of the gas turbine power output to the emergency power output is terminated, and the power output of the gas turbine engine is ramped up so that the gas turbine engines 10, 20 may again be operated at a set power output according to a power demand signal in step 210.

During method step 260, the fuel mass flow consumed by the gas turbine engines 10, 20 is made up from the remaining fuel mass flow provided by fuel gas compressor 54 remaining in operation, plus a mass flow by which the fuel mass buffered in the buffering volume provided by plant supply line 52 is reduced. If the mass flow which can be sustained by fuel gas compressor 54 is lower than the fuel mass flow consumed by the gas turbine engines 10, 20 at the emergency power output, the pressure in plant supply line 52 drops over time. As soon as the actual pressure in plant supply line 52 drops below a critical required minimum pressure for operating the gas turbine engines at the emergency power output, the gas turbine engines 10, 20 must be shut down. Hence, the emergency power output may be chosen such that the fuel mass flow provided by fuel gas compressor 54 plus the fuel mass buffered in plant supply line 52 are sufficient to operate the gas turbine engines 10, 20 at the emergency power output during the time required to take fuel gas compressor 55 into operation.

The skilled person will appreciate that the emergency power output of the gas turbine engines 10, 20 shall, preferably, be a power output at which the generators 15, 25, of the gas turbine engines 10, 20 stay connected to the grid, that is, the related grid switches shall not be opened. In other embodiments, it is possible to step-download the gas turbine engines to "full speed—no load," that is, operating at a speed which is at least essentially synchronous with the grid frequency but with the grid switches opened, as indicated above. This, at least, provides a lower limitation for an allowable emergency power output. Other operating considerations may provide further restrictions as to a lower allowable emergency power output.

In embodiments, fuel supply line 52 is designed and dimensioned so as to provide a sufficiently large buffering volume for operating the gas turbine engines 10, 20 at a minimum allowable emergency power output during the time until a previously non-operating fuel gas compressor is in full operation. This may, for one instance, be achieved in designing the plant supply line 52 with a sufficiently large cross section. In other instances, where the plant supply line 52 is already existing, an external buffering vessel may be provided in fluid communication with plant supply line 52.

It will be appreciated that the power output of the gas turbine engines 10, 20 has a direct impact on the mass flow and temperature of the gas turbine flue gases, which are used to generate steam for steam turbine engine 30 in heat recovery steam generator 40. This means that the power output of the steam turbine engine 30 is reduced, whereby this reduction in power output is delayed due to the thermal inertia of the heat recovery steam generator 40. If the temperature of the flue gases from the gas turbine engines 10, 20 drops below a certain threshold, the steam generated in the heat recovery steam generator 40 may no longer be at a temperature and pressure sufficient to sustain operation of the steam turbine engine 30. As a consequence, it may be necessary to shut down the steam turbine engine 30.

In this respect, the emergency power output of the gas turbine engines 10, 20 may be defined such that a minimum temperature and pressure can be provided in heat recovery steam generator 40 so as to sustain operation of the steam turbine engine 30 with steam turbine engine generator 35 staying connected to the grid. The buffering volume provided by plant supply line 52 may be designed such that the pressure in the plant supply line 52, starting at a nominal plant supply pressure, does not drop below a fuel pressure required to operate the gas turbine engines 10, 20 at the emergency power output and with the reduced mass flow provided by the fuel gas compressor(s) 53, 54, and/or 55 remaining in operation.

Depending on the line supply pressure, the above-described method may be conducted in a slightly different manner. If the line supply pressure is sufficient to operate the gas turbine engines 10, 20 at the emergency power output, the fuel gas compressors 53, 54, 55 may, during the run-up period of the previously non-operating fuel gas compressor, be completely isolated from the plant supply line 52, and the fuel may be supplied to the plant supply line 52 through a bypass line 57 and a check valve 56. The bypass line 57 and the check valve 56 provide a bypass connection between utility supply line 51 and plant supply line 52, bypassing the fuel gas compressors 53, 54, 55. Check valve 56 is provided to avoid backflow of fuel from plant supply line 52 into a utility supply line 51, but to allow the flow of fuel from utility supply line 51 to plant supply line 52. In another variant, compressor 53 remaining in operation may be operated and provide compressed fuel gas from utility supply line 51 to plant supply line 52 as long as the actual plant supply pressure in plant supply line 52 is higher than the line supply pressure in utility supply line 51, that is, as long as check valve 56 is closed.

However, if it is detected that check valve 56 opens fluid communication between utility supply line 51 and plant supply line 52 through bypass line 57, the fuel gas compressors 53, 54, and/or 55 are fluidly isolated from plant supply line 52, and the gas turbine engines 10, 20 are supplied with fuel gas from utility supply line 51 through bypass line 57 at the line supply pressure. In these operating modes, the pressure in plant supply line 52, that is, the fuel pressure available for the gas turbine engines, will not drop essentially below the line supply pressure. The emergency power output of the gas turbine engines 10, 20 may thus be chosen dependent on the line supply pressure and so that the associated minimum required fuel gas pressure is lower than or at most equal to the line supply pressure.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

The invention claimed is:

1. A method for operating a power plant, the power plant comprising at least one gas turbine engine and at least one fuel gas compressor, the method comprising:
supplying fuel gas through a utility supply line, wherein the fuel gas in the utility supply line is at a line supply pressure;
compressing the fuel gas to a plant supply pressure in one or more operating fuel gas compressors of the at least one fuel gas compressor and supplying the compressed fuel gas to a plant supply line;
operating the at least one gas turbine engine to generate a power output, wherein the power output is a set power output according to a power demand signal;
detecting whether one of the one or more operating fuel gas compressors has a failure;

and, upon detecting the failure of the one of the one or more operating fuel gas compressors, reducing the power output of the at least one gas turbine engine to an emergency power output which is lower than the set power output and restricting the power output of the at least one gas turbine engine to the emergency power output, and starting and putting into operation a previously non-operative fuel gas compressor;

wherein the reduction of the power output is performed in one single step and controlled by at least one feedforward control signal.

2. The method according to claim 1, comprising:
providing the at least one feedforward control signal to at least one fuel flow control valve of the at least one gas turbine engine and changing a position of the at least one fuel flow control valve to a predetermined emergency position; and
subsequently operating the at least one gas turbine engine in a load control mode at the emergency power output.

3. The method according to claim 2, wherein the predetermined emergency position of the at least one fuel flow control valve is a valve position corresponding to an expected position of the at least one fuel flow control valve at the emergency power output.

4. The method according to claim 1, wherein the at least one fuel gas compressor includes one or more operating fuel gas compressors remaining in operation, and wherein the method further comprises:
determining a critical gas turbine engine power output which is sustainable based upon fuel gas mass flow and output pressure characteristics of the one or more operating fuel gas compressors remaining in operation; and
determining the emergency power output to be lower or at most equal to the critical power output.

5. The method of claim 1, further comprising:
guiding an exhaust gas mass flow of the at least one gas turbine engine through at least one heat recovery steam generator, generating steam, and supplying the generated steam to a steam turbine to drive the steam turbine;
wherein the emergency power output is higher than or at least equal to a minimum gas turbine engine power output required to generate steam of a minimum mass flow, pressure and temperature to drive the steam turbine.

6. The method according to claim 1, comprising:
determining a minimum required plant supply pressure for operation of the at least one gas turbine engine at the emergency power output;
determining a start-up time of the previously non-operative fuel gas compressor; and
providing a buffering volume suitable for buffering fuel gas, the buffering volume fluidly arranged between the at least one fuel gas compressor and the at least one gas turbine engine, wherein the buffering volume is sufficiently large to supply fuel gas to the at least one gas turbine engine running at the emergency power output after failure of the one of the one or more operating fuel gas compressors and prior to full operation of the previously non-operative fuel gas compressor without the pressure in the buffering volume dropping below the minimum required plant supply pressure.

7. The method according to claim 1, comprising terminating the restriction of the power output to the emergency power output and controlling the power output of the at least one gas turbine engine by the power demand signal after the previously non-operative fuel gas compressor is in full operation.

8. The method according to claim 1, wherein a bypass line connects the utility supply line and the plant supply line and bypasses the at least one fuel gas compressor;
wherein a check valve is installed in the bypass line to avoid backflow of fuel gas from the plant supply line into the utility supply line while enabling flow of fuel gas from the utility supply line to the plant supply line; and,
wherein the method comprises determining a critical gas turbine power output which is sustainable with the line supply pressure and determining the emergency power output to be lower or at most equal to the critical gas turbine power output.

9. The method according to claim 1, wherein a bypass line connects the utility supply line and the plant supply line and bypasses the at least one fuel gas compressor;
wherein a check valve is installed in the bypass line to avoid backflow of fuel gas from the plant supply line into the utility supply line while enabling flow of fuel gas from the utility supply line to the plant supply line; and
wherein at least one fuel gas compressor of the one or more operating fuel gas compressors remains in operation after failure of the one fuel gas compressor of the one or more operating fuel gas compressors, the method comprising:
determining a first power output of the at least one gas turbine engine sustainable with the line supply pressure; determining a second power output of the at least one gas turbine engine sustainable with the at least one fuel gas compressor remaining in operation; and, if the first power output of the at least one gas turbine engine sustainable with the line supply pressure is larger than the second power output of the at least one gas turbine engine sustainable with the at least one fuel gas compressor remaining in operation, fluidly isolating the at least one fuel gas compressor remaining in operation from the plant supply line.

10. The method according to claim 1, wherein the power plant comprises at least two fuel gas compressors, and wherein at least one fuel gas compressor of the one or more operating fuel gas compressors remains in operation after failure of the one fuel gas compressor of the one or more operating fuel gas compressors;
the method comprising determining a critical power output of the at least one gas turbine engine which is sustainable with a maximum pressure of the plant supply pressure sustainable by the at least one fuel gas compressor remaining in operation and the line supply pressure, and determining the emergency power output to be lower or at most equal to the critical power output.

11. A power plant comprising:
at least one gas turbine engine;
at least one fuel gas compressor having an upstream end connected to a utility supply line;
a plant supply line connecting a downstream end of the at least one fuel gas compressor and the at least one gas turbine engine; and
a fuel gas pressure control system and a gas turbine engine control system, wherein a control line is provided from the fuel gas pressure control system to the gas turbine control system and is adapted and configured to forward a fuel gas compressor failure signal from the fuel gas pressure control system to the gas turbine engine control system; and wherein the gas turbine engine control system is adapted and configured to, in response to the fuel gas compressor failure signal, forward a preset feedforward emergency control signal at least to at least one fuel flow control valve of the at least one gas turbine engine.

12. The power plant according to claim 11, comprising a buffering volume suitable for buffering fuel gas and fluidly arranged between the at least one fuel gas compressor and the at least one gas turbine engine, wherein the buffering volume is sufficiently large to supply fuel gas to the at least one gas turbine engine running at an emergency power output during the time required to start a fuel gas compressor from standstill without the pressure in the buffering volume dropping below a minimum required plant supply pressure required to operate the at least one gas turbine engine at the emergency power output.

13. A method for operating a power plant, the power plant comprising at least one gas turbine engine and at least one fuel gas compressor, the method comprising:
supplying fuel gas through a utility supply line, wherein the fuel gas in the utility supply line is at a line supply pressure;
compressing the fuel gas to a plant supply pressure in one or more operating fuel gas compressors of the at least one fuel gas compressor and supplying the compressed fuel gas to a plant supply line;
operating the at least one gas turbine engine to generate a power output, wherein the power output is a set power output according to a power demand signal;
detecting whether one of the one or more operating fuel gas compressors has a failure;
and, upon detecting the failure of the one of the one or more operating fuel gas compressors, reducing the power output of the at least one gas turbine engine to an emergency power output which is lower than the set power output and restricting the power output of the at least one gas turbine engine to the emergency power output, wherein the reduction of the power output is performed in one single step and controlled by at least one feedforward control signal;
providing the at least one feedforward control signal to at least one fuel flow control valve of the at least one gas turbine engine and changing a position of the at least one fuel flow control valve to a predetermined emergency position, wherein the predetermined emergency position of the at least one fuel flow control valve is a valve position corresponding to an expected position of the at least one fuel flow control valve at the emergency power output; and
subsequently operating the at least one gas turbine engine in a load control mode at the emergency power output.

14. The method according to claim 13, wherein the at least one fuel gas compressor includes one or more operating fuel gas compressors remaining in operation, and wherein the method further comprises:

determining a critical gas turbine engine power output which is sustainable based upon fuel gas mass flow and output pressure characteristics of the one or more operating fuel gas compressors remaining in operation; and
determining the emergency power output to be lower or at most equal to the critical power output.

15. The method of claim 13, further comprising:
guiding an exhaust gas mass flow of the at least one gas turbine engine through at least one heat recovery steam generator, generating steam, and supplying the generated steam to a steam turbine to drive the steam turbine;
wherein the emergency power output is higher than or at least equal to a minimum gas turbine engine power output required to generate steam of a minimum mass flow, pressure and temperature to drive the steam turbine.

16. The method of claim 13, further comprising starting and putting into operation a previously non-operative fuel gas compressor.

17. The method according to claim 16, comprising:
determining a minimum required plant supply pressure for operation of the at least one gas turbine engine at the emergency power output;
determining a start-up time of the previously non-operative fuel gas compressor; and
providing a buffering volume suitable for buffering fuel gas, the buffering volume fluidly arranged between the at least one fuel gas compressor and the at least one gas turbine engine, wherein the buffering volume is sufficiently large to supply fuel gas to the at least one gas turbine engine running at the emergency power output after failure of the one of the one or more operating fuel gas compressors and prior to full operation of the previously non-operative fuel gas compressor without the pressure in the buffering volume dropping below the minimum required plant supply pressure.

18. The method according to claim 17, comprising terminating the restriction of the power output to the emergency power output and controlling the power output of the at least one gas turbine engine by the power demand signal after the previously non-operative fuel gas compressor is in full operation.

19. The method according to claim 13, wherein a bypass line connects the utility supply line and the plant supply line and bypasses the at least one fuel gas compressor;
wherein a check valve is installed in the bypass line to avoid backflow of fuel gas from the plant supply line into the utility supply line while enabling flow of fuel gas from the utility supply line to the plant supply line; and,
wherein the method comprises determining a critical gas turbine power output which is sustainable with the line supply pressure and determining the emergency power output to be lower or at most equal to the critical gas turbine power output.

* * * * *